US006550973B2

United States Patent
Yeo

(10) Patent No.: US 6,550,973 B2
(45) Date of Patent: Apr. 22, 2003

(54) SEALING ASSEMBLY FOR BEARING

(76) Inventor: In Jun Yeo, RM302, La Dong, Dongbo Apt., Hwangsung-Dong, Kyungju-City (KR)

( * ) Notice: Subject to any disclaimer, the term of this patent is extended or adjusted under 35 U.S.C. 154(b) by 19 days.

(21) Appl. No.: 09/726,117

(22) Filed: Nov. 30, 2000

(65) Prior Publication Data

US 2002/0064325 A1 May 30, 2002

(30) Foreign Application Priority Data

Jan. 4, 2000 (KR) .............................................. 2000-154

(51) Int. Cl.[7] .............................................. F16C 33/76
(52) U.S. Cl. ...................................... 384/484; 277/353
(58) Field of Search ................................ 384/484, 477, 384/485, 486, 482; 277/559, 353, 549, 402, 551

(56) References Cited

U.S. PATENT DOCUMENTS

| 4,434,985 | A | * | 3/1984 | Sonnerat | 277/353 |
| 4,958,942 | A | * | 9/1990 | Shimizu | 277/353 |
| 5,005,992 | A | * | 4/1991 | Dreschmann et al. | 384/482 |
| 5,096,207 | A | * | 3/1992 | Seeh et al. | 277/353 |
| 5,201,533 | A | * | 4/1993 | Lederman | 277/551 |
| 5,676,383 | A | * | 10/1997 | Chandler | 277/559 |
| 6,170,992 | B1 | * | 1/2001 | Angelo et al. | 277/551 |

FOREIGN PATENT DOCUMENTS

JP      2001193748 A    *   7/2001

* cited by examiner

Primary Examiner—Christopher P. Schwartz
Assistant Examiner—Melanie Torres

(57) ABSTRACT

A sealing assembly used for a wheel bearing of automobiles in order to prevent ingress of contaminating agents such as water or dust into a bearing. The sealing assembly includes an inner annular element, an outer annular element, a seal rubber, and grease. More particularly, the sealing assembly adapts a particularly shaped inner annular element. Additionally, the seal rubber includes a plurality of projecting lips and an uppermost lip of the seal rubber comes in contact with an outer surface of the inner annular element to enlarge the grease containing area and improve the isolation of the bearing by preventing the leak of grease from the sealing assembly and ingress of contaminating agent into the bearing.

9 Claims, 1 Drawing Sheet

SEALING ASSEMBLY FOR BEARING

BACKGROUND OF THE INVENTION

1. Field of the Invention

The present invention relates to a sealing assembly used for a wheel bearing of automobiles. More specifically, the present invention relates to a sealing assembly which prevents ingress of contaminating agents such as dirty water or dust into a bearing, and includes an inner annular element, an outer annular element, a seal rubber, and grease.

2. Description of Related Art

Heretofore, many types of sealing elements have been developed, and exemplary of the known type of sealing element is that shown in FIG. 3.

FIG. 3 is a sectional view of a conventional sealing assembly 100. The conventional seal assembly includes an inner annular element 132 opposed by an outer annular element 134. The inner annular element 132 includes an inner surface 144 and an outer surface 146 thereon. A seal rubber 136 is interposed between the inner annular element 132 and the outer annular element 134 and includes lips 140 projecting from the seal rubber 136. The lips 140 are only formed to contact the inner surface 144 of the inner annular element 132. As also shown, grease 142 is inserted between the inner surface 144 of the inner annular element 132 and the lips 140 of the seal member 136.

In comparison with the present invention which will be described below, the amount of grease 142 contained in the known sealing assembly 100 is much smaller than that of the present invention, and the potential risk to abrasion and noise by the ingress of dust or water is much higher due to the simple shape of the lips 140 in the known art.

In the case of mounting the conventional bearing employing the known "pack seal type" sealing assembly as shown in FIG. 3, certain problems are raised. For example, the ingress of contaminating agents such as dust or dirty water might cause not only wear and distortion of lips 140 but also abrasion of the inner ring or outer ring of the bearing and noise occurred by contaminating agents stuck to bearing balls.

Therefore, a need in the art exists for an improved sealing assembly of the type discovered by the inventor.

SUMMARY OF THE INVENTION

Accordingly, it is a primary object of the present invention to provide a sealing assembly which is superior in preventing the ingress of contaminating agents such as dirty water or dust therein.

It is a further object of the present invention to provide a sealing assembly which is a "high pack seal type" sealing assembly instead of a "pack seal type" sealing assembly.

It is yet another object of the present invention to provide a high pack seal type sealing assembly having an inner annular element of a characteristic shape, the shape including an inner surface and an outer surface.

It is a further object of the present invention to provide a high pack type sealing assembly in which a seal rubber includes a plurality of projecting lip portions, at least one of which is in contact with an outer surface of the inner annular element.

It is still a further object of the present invention to provide a sealing assembly having improved isolation of the bearing by preventing the leak of grease in the sealing assembly and ingress of contaminating agents into the bearing.

These and other objects of the present invention are achieved by providing a sealing assembly used for a wheel bearing of automobiles in order to prevent ingress of contaminating agents such as water or dust into a bearing. The sealing assembly includes an inner annular element, an outer annular element, a seal rubber, and grease. More particularly, the sealing assembly adapts a "]"-shaped inner annular element. Additionally, the seal rubber includes a plurality of projecting lips and an uppermost lip of the seal rubber comes in contact with an outer surface of the inner annular element. As a result, it is possible to enlarge the grease containing area and improve the isolation of the bearing by preventing the leak of grease from the sealing assembly and ingress of contaminating agents into the bearing. The primary characteristics therefore are the "]"-shaped inner annular element, and modifying the shape of lips projected on the seal rubber interposed between the inner annular element and the outer annular element so as to improve the performance of the bearing by isolating the bearing from the surrounding environment.

The present invention will become more fully understood from the detailed description given hereinbelow and the accompanying drawings which are given by way of illustration only, and thus are not limitative of the present invention, and wherein:

BRIEF DESCRIPTION OP THE DRAWINGS

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

DETAILED DESCRIPTION OF THE PREFERRED EMBODIMENT

Figure 1:
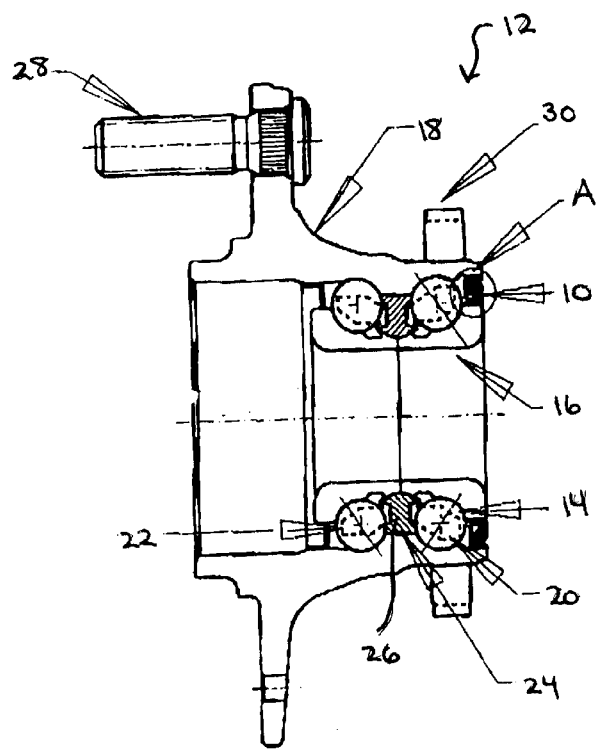
FIG. 1 is a sectional view of a bearing mounting a sealing assembly according to the present invention.

Referring first to the preferred embodiment of the present invention as shown in FIG. 1, the location of a sealing assembly 10 within its environment is shown in order to illustrate the advantages thereof over the known art.

Specifically, FIG. 1 is a sectional view of a wheel bearing 12 mounting the sealing assembly 10 according to the present invention. The wheel bearing 12 includes balls 14 interposed between an inner ring 16 and an outer ring 18 of the wheel bearing 12. The structure which consists of balls 14, the inner ring 16 and the outer ring 18 is supported by a first retainer 20 and a second retainer 22. A cavity 24 of the structure is filled with grease 26 and the cavity 24 is closed at its end with the sealing assembly 10 of the present invention. The wheel bearing 12 is connected to the wheel by means of a bolt 28.

The structure of the wheel bearing 12 is such that the wheel bearing 12 includes the balls 14, the inner ring 16 and the outer ring 18 to be put together with a hub and a spindle in a body (not shown). The sealing assembly 10 prevents the ingress of contaminating agents from the surrounding environment. A tone wheel 30 is used for sensing of an ABS (Antilock Brake System) and bolts 28 are provided for connection with other machinery.

When a vehicle is inactive, the inner ring 16 of a wheel bearing 12, a shaft (not shown) and the tone wheel 30 attached to the inner ring 16 rotate at the same. Then, the tone wheel 30 transfers the signal to the ABS.

In the above described wheel bearing 12, the object of the present invention is to provide an improved sealing assembly superior in sealing and free from the ingress of contaminating agents which can occur in the conventional art.

Figure 2:
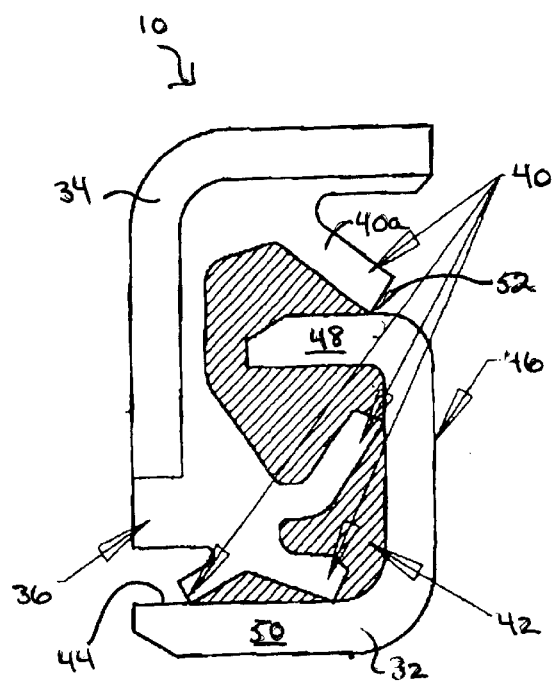
FIG. 2 is an enlarged view of part "A" in FIG. 1, showing a sectional view of the sealing assembly according to the present invention.

Referring now to FIG. 2, there is shown an enlarged view of part A in FIG. 1 and is more specifically a sectional view of the sealing assembly 10 according to the present invention.

In FIG. 2, there is an inner annular element 32 opposed by an outer annular element 34. A seal rubber 36 is interposed between the inner annular element 32 and the outer annular element 34 and includes a plurality of projecting lips 40 thereon. Grease 42 is contained between the inner annular element 32 and the seal rubber 36.

The inner annular element 32 is of a characteristic shape as shown in FIG. 2. Specifically the inner annular element 32 is of a "]"-shape and includes an inner surface 44 and an outer surface 46 thereon. As shown, there is a relative upper end 48 and a relative lower end 50 of the inner annular element 32 as well.

The plurality of lips 40 projecting from the seal member 36 are such that at least one of the lips 40a has a terminal end 52 thereof in contact with the outer surface 46 of the upper end 48 of the inner annular element 32.

The above-described sealing assembly ensures a large space for the grease 42. Furthermore, the upper lip 40a of the seal rubber 36 according to the present invention contacts outside of the inner annular element 32 so that an abrasion and distortion of lips 40 and stripping-off of ball 14 and tracks of inner 16 and outer ring 18 caused by the ingress of contaminating agents can be prevented.

Therefore, the primary characteristics of the present invention include employing the "]"-shaped inner annular element 32 and modifying the shape of lips 40 projecting from the seal rubber 36 interposed between the inner annular element 32 and outer annular element 34, so as to improve the performance of the bearing by isolating the bearing from the surrounding environment.

Figure 3:
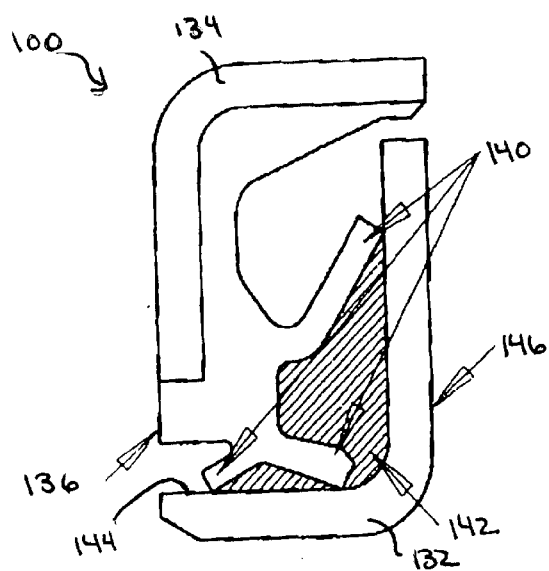
FIG. 3 is a sectional view of a conventional sealing assembly.

When comparing with a known sealing assembly as described in connection with FIG. 3 for example, the sealing assembly of the present invention adapts a "]"-shaped inner annular element 32 while the conventional art generally adapts an "L"-shaped inner element 132. In accordance with the above change, the lips 40 projecting from the seal rubber 36 have been modified so that the upper lip 40a of the seal rubber 36 can come into contact with the outer surface 46 of the inner annular element 32. As a result, the isolation of the bearing is improved by preventing the leak of grease in the sealing assembly and ingress of contaminating agents into the bearing.

Accordingly, the present invention improves a sealing assembly used for a bearing, which is able to prevent the ingress of contaminating agents such as dust or dirty water by renewing the shape of seal rubber lips as well as modifying the structure of the inner annular element into a particular shape as a way to overcome the aforementioned drawbacks such as generation of noise or formation of a gap due to stripping-off of ball or abrasion of the tracks of the inner and outer ring, which is usually resulted from the ingress of the dust or dirty water when mounting the "pack seal type" sealing assembly on a bearing.

As a result, it is possible to improve the isolation of the bearing by preventing the leak of grease in the sealing assembly and ingress of a contaminating agent into the bearing.

The invention being thus described, it will be obvious that the same may be varied in many ways. Such variations are not to be regarded as a departure from the spirit of and scope of the invention, and all such modification as would be obvious to one skilled in the art are intended to be included within the scope of the following claims.

What is claimed is:

1. A sealing assembly for a wheel bearing of automobiles comprising:

an outer annular element;

an inner annular element, said inner annular element having an interior surface and an exterior surface and having a first leg parallel to a second leg thereof and intermediately joined by an end wall;

a seal rubber having lips extending to both the interior surface and exterior surface of said inner annular element; and a lubricant sealed between said seal rubber and said inner annular element such that said lubricant is in contact with the inner surface and outer surface of said inner annular element.

2. The sealing assembly of claim 1, wherein at least one lip of said seal rubber is in contact with the outer surface of said inner annular element.

3. The sealing assembly of claim 2, wherein terminal ends of each first and second leg of said inner annular element are oriented to an interior of said bearing.

4. The sealing assembly of claim 3, wherein said grease is sealed against the outer surface of said inner annular element by said lip projected onto the outer and upper surface of said seal rubber.

5. The sealing assembly of claim 3, wherein the plurality of lips of said seal rubber include at least one lip extending over an upper outer surface of said inner annular element such that a distal end of said lip is in contact with the outer surface of said inner annular element.

6. The sealing assembly of claim 3, wherein at least one lip of said seal member is in contact with the outer surface of said inner annular element.

7. The sealing assembly of claim 1, wherein at least a portion of said seal member is in contact with the outer surface of said inner annular element.

8. The sealing assembly of claim 1, wherein the first leg of said inner annular element has a preset radius less than a preset radius of the second leg thereof.

9. The sealing assembly of claim 1, wherein the end wall is perpendicular to an axial center of said bearing.

* * * * *